United States Patent [19]

Hasegawa

[11] Patent Number: 4,802,209
[45] Date of Patent: Jan. 31, 1989

[54] PAGING SYSTEM FOR ELECTRONIC TELEPHONE APPARATUS

[75] Inventor: Iwao Hasegawa, Tachikawa, Japan

[73] Assignee: Kabushiki Kaisha Toshiba, Japan

[21] Appl. No.: 75,892

[22] Filed: Jul. 21, 1987

[30] Foreign Application Priority Data

Sep. 29, 1986 [JP] Japan .................. 61-231056

[51] Int. Cl.⁴ ........................................ H04M 3/50
[52] U.S. Cl. ........................ 379/217; 379/210; 379/263
[58] Field of Search ............ 379/217, 157, 210, 214, 379/218, 263

[56] References Cited

U.S. PATENT DOCUMENTS 3,676,603  7/1972  Budrys et al. ................ 379/217 X

FOREIGN PATENT DOCUMENTS

| 0037510 | 3/1979 | Japan | 379/210 |
| 0133010 | 10/1979 | Japan | 379/217 |
| 0103565 | 8/1981 | Japan | 379/210 |
| 0203055 | 10/1985 | Japan | 379/217 |

Primary Examiner—Thomas W. Brown
Attorney, Agent, or Firm—Banner, Birch, McKie & Beckett

[57] ABSTRACT

The present invention discloses a switching system including an exchange coupled to a plurality of telephone lines, a plurality of telephone sets, and an attendant console. When the exchange receives a paging request of an incoming telephone call from the attendant console, it determines one of a plurality of predetermined answer codes and causes the attendant console to display the determined answer code data. Then the exchange makes a speed path between the incoming telephone call and the telephone set, when the answer code data is dialed at the telephone set after the call and answer code data are announced.

31 Claims, 4 Drawing Sheets

| ADDRESS X | CONTENTS |
|---|---|
| MB1 TOP | TDN1 |
| MB1 TOP + 1 | TDN2 |
| MB1 TOP + 2 | TDN3 |
| , | , |
| , | , |
| , | , |
| MB1 TOP + i | TDNx |
| , | , |
| , | , |
| , | , |
| MB1 END − 1 | FF |
| MB1 END | FF |

| ADDRESS Y | CONTENTS |
|---|---|
| MB2 TOP | AC1 |
| MB2 TOP + 1 | AC2 |
| MB2 TOP + 2 | AC3 |
| , | , |
| , | , |
| , | , |
| MB2 TOP + i | ACx |
| , | , |
| , | , |
| , | , |
| MB2 END − 1 | ACn-1 |
| MB2 END | ACn |

| ADDRESS Z | CONTENTS |
|---|---|
| MB3 | ACx |

PAGING SYSTEM FOR ELECTRONIC TELEPHONE APPARATUS

BACKGROUND OF THE INVENTION

1. Field of the Invention

This invention relates to the field of switching systems, and more particularly relates to a paging method and apparatus corresponding to incoming telephone calls.

2. Description of the Prior Art

There have been rapid developments in telephone switching systems in recent years. In general, the exchange of a switching system is coupled to a plurality of extensions comprised of telephone sets and office telephone lines. The exchange operates a call sequence by selectively connecting a calling telephone set to a designated called telephone set. The called telephone set responds to the call in order to complete the connection of a speech path between the telephone sets. The exchange also operates another call sequence by selectively connecting an incoming office telephone line to the telephone set that responds to the incoming call. The telephone set responds to the call in order to complete the connection of a speech path between the incoming office line and itself.

Generally, the switching system has a loud-speaker and an attendant console coupled to the exchange to enable the exchange to further effect another call sequence. This call sequence is as follows. When the attendant console receives an incoming call from an office line or telephone set, the exchange causes the incoming call to be placed on hold by a predetermined operation in the attendant console. The operator of the attendant console then tries to transfer the incoming call to the telephone set of the called party. If the called party responds to the transfer, the exchange connects the incoming call to the called telephone set. However, if the called party doesn't respond to the transfer because of absence etc., the operator of the attendant console notifies the called party of the incoming call with a loud-speaker. If the called party dials a predetermined number at some telephone set after hearing the notice, the exchange connects the incoming call to the dialing telephone set. The above call sequence with the attendant console and the loud-speaker is called a "Meet-Me-Page" feature.

In conventional telephone switching systems, the attendant console can only receive one incoming telephone call to carry out this feature. Therefore, if the operator of the attendant console receives a plurality of requests to carry out the feature, the operator cannot respond to the requests. Thus the present capabilities of the switching system are inadequate. Due to the inadequacy of present systems, the number of page requests is not maximized.

SUMMARY OF THE INVENTION

It is therefore an object of the present invention to provide a paging method and apparatus, for a switching system, capable of responding to a plurality of incoming telephone calls.

It is another object of the present invention to provide a paging apparatus, for a switching system, which is capable of operating easily and minimizing the chance of a mistake by an operator by displaying information used in the paging operation.

According to the present invention, and in order to realize the above objects, a switching system is provided which includes an exchange with an exchanging switch coupled to a plurality of telephone lines, a plurality of telephone sets coupled to the exchange and an attendant console coupled to the exchange. The switching system is provided with a first memory adapted to store data corresponding to a plurality of incoming telephone calls, a second memory for storing data corresponding to a plurality of answer codes, a display on the attendant console, a loud-speaker and control circuitry. The incoming telephone call data corresponds to the data of at least one of the answer codes. The control circuitry controls the display to display the answer code data corresponding to the incoming telephone call when it receives a page request from the attendant console. Then the control circuitry automatically controls the connection between the incoming telephone call and the telephone set with reference to the stored incoming telephone call data and the stored answer code data when the answer code data is dialed at the telephone set after a voice message, including the displayed answer code data, is generated from the loud-speaker by an operator of the attendant console. Thus, the operator is permitted to operate the attendant console to carry out the paging operations for a plurality of incoming telephone calls.

BRIEF DESCRIPTION OF THE DRAWINGS

The subject matter which is regarded as the invention is particularly pointed out and distinctly claimed in the claims of the specification. The invention, however, both as to organization and method of practice, together with further objects and advantages thereof, may be best understood by reference to the following detailed description of the invention taken in conjunction with the drawings in which:

FIGS. 2, 3 and 4 show memory blocks of a memory device shown in FIG. 1 and the contents of the memory blocks;

DESCRIPTION OF THE PREFERRED EMBODIMENTS

Figure 1:
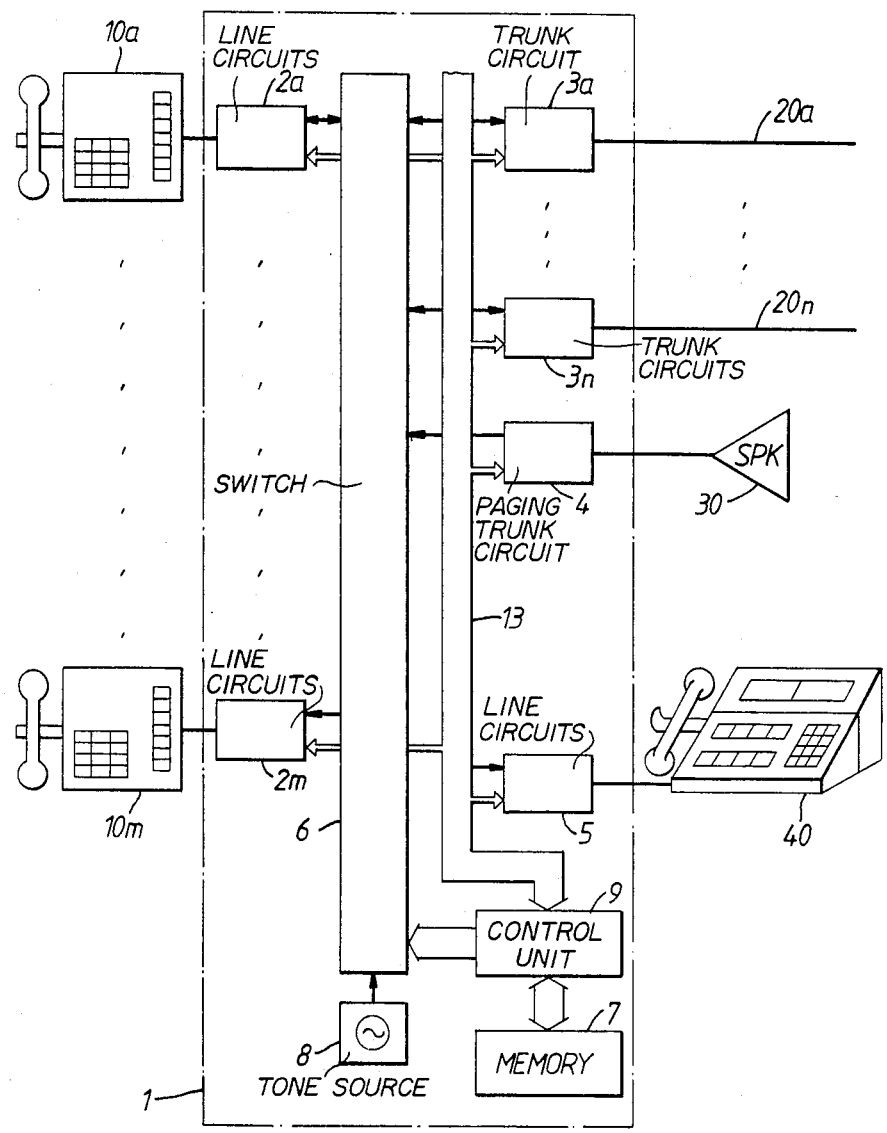
FIG. 1 is a general block diagram illustrating one embodiment of the present invention.

FIG. 1 is an illustration of one embodiment of the present invention showing exchange 1. Connected to exchange 1 are EKTs (electronic key telephone sets) 10a-10m, office lines 20a-20n, loud-speaker 30 and attendant console 40. Exchange 1 includes line circuits 2a-2m connected to respective EKTs 10a-10m, trunk circuits 3a-3n connected to respective office lines 20a-20n, paging trunk circuit 4 connected to loud-speaker 30, line circuit 5 connected to attendant console 40, exchanging switch 6, memory device 7, tone signal source unit 8, control unit 9 and data bus 13.

Each of line circuits 2a-2m includes a converter (not shown) which converts digital signals passing through exchanging switch 6 to analog signals to be sent to the respective EKTs and analog signals to digital when passed in the other direction, a controller (not shown) which basically controls transmission of control data from the respective EKTs to control unit 9 through data bus 13 and vice versa, and an interface between the respective EKTs and the converter which operates to transmit and receive analog signals, bi-directionally and in real time. The interface also operates to transmit and receive control data regarding telephone calls between the respective EKTs and the controller. Line circuit 5 includes substantially the same components as line circuits 2a–2m.

Each of trunk circuits 3a-3n includes a converter (not shown) which operates the same as the converters in line circuits 2a–2m, a controller and an interface. The interface operates to transmit and receive analog signals bi-directionally and in real time. Thus, in this respect, it has the same function as the interface in line circuits 2a–2m. However, the interface for the respective office lines is required to operate as a detector to detect a ringing signal from the respective office lines, to detect the state of call release (completion of call) of the respective office lines and to send control data representing start (and completion) of a telephone call to the exchange of the respective office line, i.e., to make (or break) the direct current loop of the respective office lines. These functions are all well known in the art as are the functions for the office line.

The controller controls the transmission of control data conducted by the interface under the control of control unit 9 and transfers the result of the detecting operation of the interface to control unit 9.

Paging trunk circuit 4 includes a converter (not shown), which converts digital signals, passing through exchanging switch 6, to analog signals to be sent to loud-speaker 30, a controller (not shown), which controls the operation of paging trunk circuit 4 by control data received from control unit 9 and an interface which operates to transmit analog signals to loud-speaker 30 in real time.

Exchanging switch 6 operates to selectively switch its own speech paths in order to selectively connect the EKTs, the office lines, loud-speaker 30, attendant console 40 and tone signal source unit 8 through the line circuits, the trunk circuits and its own speech path in any combination designated by control unit 9 in time division or multiplexed fashion. This function is also well known in the art.

Tone signal source unit 8 generates various signals necessary for indicating to the parties the status of the call connection process by way of sound, e.g., ringing tone, busy tone, waiting sound or the like.

According to a novel aspect of the invention, there is provided a device 7 that stores computer programs and several data blocks MB1-MB3 as shown in FIGS. 2-4. The data blocks MB1-MB3 are used in the following manner in this embodiment of the present invention. The contents of each of blocks MB1-MB3, shown at the right hand side of FIGS. 2-4, are stored in respective address locations shown at the left hand side of FIGS. 2-4. The first memory block MB1 stores Trunk Directory Number (TDN) data corresponding to incoming telephone lines 20a-20n when attendant console 40 responds to the incoming telephone call through office line 20a-20n, under the control of control unit 9. 'FF' data in a memory location indicates that TDN data is not stored in a corresponding address location.

The second memory block MB2 stores Answer Code (AC) data. All AC data is stored during installation or instrument check and each AC data is different from the others. The number of memory locations available for storing AC data preferably equals the number of memory locations available for storing TDN data.

The third memory block MB3 stores data relating to one AC corresponding to one of office lines 20a-20n when the paging function is requested for the incoming telephone call through the office line, under the control of control unit 9. Control unit 9 includes CPU (Central Processing Unit) (not shown) and controls the entire system by executing several computer programs stored in memory device 7 as described in more detail hereinafter.

Each of the EKTs 10a-10m and the attendant console 40 includes a hand-set, dial keys, other function keys and LEDs (Light Emitting Diodes). The EKTs also include ringers (not shown) for generating ringing sounds under the control of control unit 9. Attendant console 40 further includes a display device for displaying numerical data. During a paging operation, the display device displays data relating to one of a plurality of answer codes to notify the operator of the answer code to be used. The function keys of attendant console 40 include a paging key, a loop key, a restoration key, etc.

When a ringing signal is delivered through the office line, e.g., office line 20a, the signal is detected by the interface of trunk circuit 3a and the detecting data is sent to control unit 9 through bus 13. Then, control unit 9 responsive to the data detects whether exchange 1 is in a day-mode or a night-mode. In the day-mode the attendant console 40 is able to respond to the incoming call and in the night-mode the attendant console 40 is unable to respond to it but at least one predetermined telephone is able to respond. If control unit 9 determines the night-mode is established, it sends control data to the EKTs in order to generate a ringing sound in a known manner. On the other hand, if control unit 9 determines the day-mode is established, it sends control data to attendant console 40 in order to generate the ringing sound. Since this invention is related to the latter, the operation of the latter is explained in this specification.

When the operator of attendant console 40 depresses the loop key after hearing the ringing sound, the key data is sent to control unit 9 through line circuit 5 and bus 13. Control unit 9 sends loop control data to trunk circuit 3a through bus 13 in response to the received key data. Trunk circuit 3a makes the direct current (DC) loop of office line 20a by the received loop control data. Control unit 9 also sends sound stop data to attendant console 40 through bus 13 and line circuit 5 in response to the received key data. Attendant console 40 stops generating the ringing sound due to the received sound stop data. Control unit 9 further send switching control data to exchanging switch 6 in response to the received key data. Exchanging switch 6 makes the speech path between trunk circuit 3a and line circuit 5 by the received switching control data. Thereafter, the call originator and the operator of attendant console 40 can speak to each other.

In the course of the above operation, if the operator of attendant console 40 knows the call originator requests to transfer this call to a particular person or EKT, the operator depresses the extension dial number with the dial keys of attendant console 40. The extension number corresponds to the requested person or EKT. The extension data is sent to control unit 9 through line circuit 5 and bus 13. Control unit 9 receives the first number data and determines whether the first data indicates the extension dial number or not. If control unit 9 determines the received first data is not the extension number data, it sends alarm data to attendant console 40 in order to generate an alarm sound indicating a wrong number. If control unit 9 determines the received first data is the extension dial number, it sends switching control data to exchanging switch 6 in order to connect trunk circuit 3a to the waiting sound source of tone signal source unit 8. Therefore, the waiting sound is sent to office line 20a through exchanging switch 6 and trunk circuit 3a.

Control unit 9 also sends switching control data to exchanging switch 6 in order to connect line circuit 5 to the non-sound source of tone signal source unit 8. After the above operation, control unit 9 receives the extension data and determines whether the received data corresponds to one of the predetermined extension numbers or not. If control unit 9 determines the received dialing data does not correspond to one of them, it sends alarm data to attendant console 40 as in the previously described operation. If control unit 9 determines the received dialing data corresponds to one of them, it determines whether the dialed extension EKT is in a busy state or not. If the dialed extension EKT is busy, control unit 9 sends switching control data to exchanging switch 6 in order to connect line circuit 5 to the busy tone source of tone signal source unit 8.

Also, if the dialed extension EKT is not busy, control unit 9 sends switching control data to exchanging switch 6 in order to connect line circuit 5 to the ringing tone source of tone signal source unit 8. Therefore, the operator of attendant console 40 can hear the busy tone or the ringing tone.

If the dialed extension EKT, e.g., EKT 10a, is not busy, control unit 9 sends control data to EKT 10a through bus 13 and line circuit 2a in order to generate the ringing sound. When, in spite of the ringing sound, EKT 10a does not respond to the call, the operator of attendant console 40 determines the call will not be responded to and depresses a restoration key. The key data is sent to control unit 9. Control unit 9 sends sound stop data to EKT 10a in response to the received key data. EKT 10a receives the sound stop data and stops generating the ringing sound. Control unit 9 also sends switching data to exchanging switch 6 in order to break the connections between trunk circuit 3a and the waiting sound source and between line circuit 5 and the non-sound source, and make the speech path between trunk circuit 3a and line circuit 5. Therefore, the call originator through office line 20a and the operator of attendant console 40 can speak to each other again.

Figure 5:
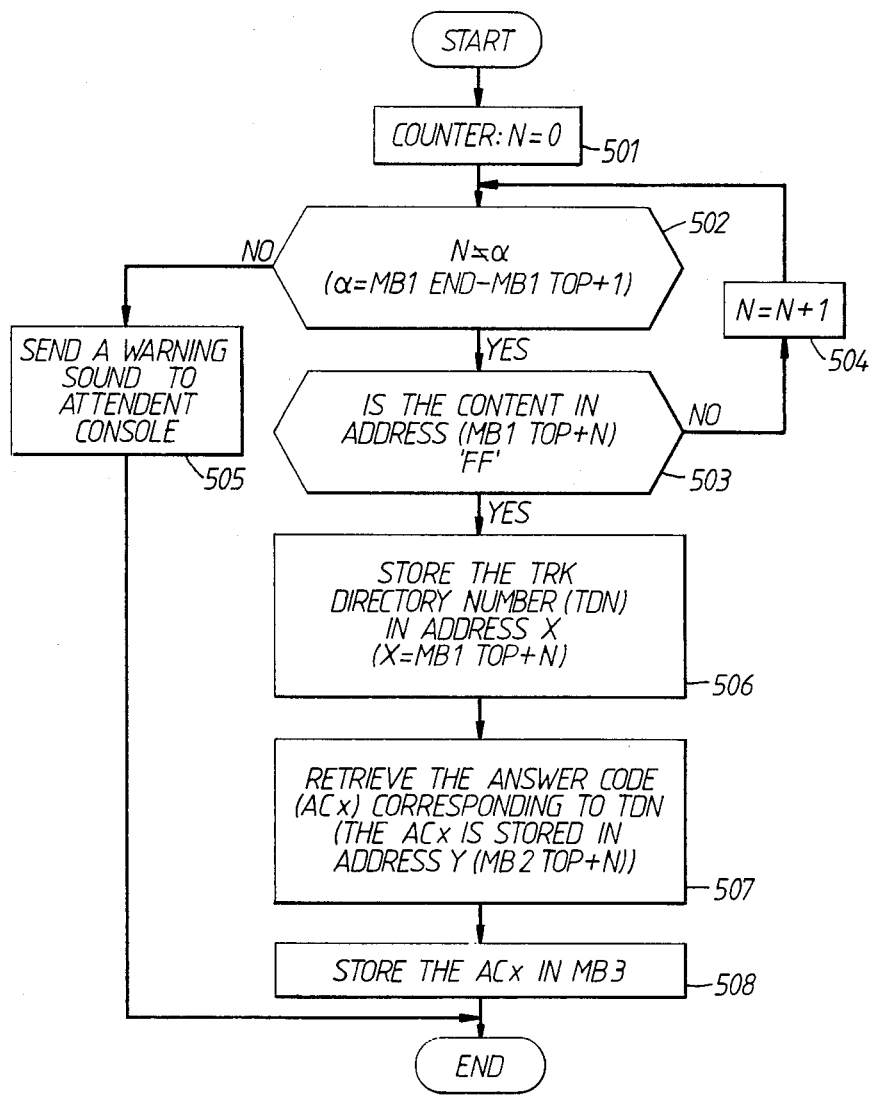
FIG. 5 is a flow chart showing an answer code determination process when a paging operation is requested.

In response to the above operation, the operator of attendant console 40 can initiate a paging operation by depressing the predetermined key or dial number indicating a request to commence the operation. The key data is sent to control unit 9. Since the predetermined dial number is an extension dial number in this case, trunk circuit 3a is connected to the waiting sound source and line circuit 5 is connected to the non-sound source when control unit 9 receives the first dialing data, as in the previously described operation. After receiving the dialing number data, control unit 9 determines whether the dialing data is the predetermined number data or not. If control unit 9 determines the received dialing data is the predetermined number data, it determines whether the memory block MB1, shown in FIG. 2, has a vacant storage area or not by determining the presence of stored 'FF' data. This operation is described in FIG. 5.

At first, control unit 9 clears the internal counter (N=0), step 501. Then, control unit 9 determines whether N equals the last address at which TDN data is capable of being stored at in the block MB1 (N=: MB1 END - MB1TOP +1), step 502, if so, control unit 9 further determines whether a vacant storage area exists by checking the contents of the address to see if it contains 'FF,' step 503. If not, control unit 9 causes the counter to count up (N=N+1), step 504, and it continues to look for a vacant area in the block MB1 (steps 502-504). If control unit 9 determines that block MB1 does not have a vacant storage area (steps 502-504), it sends switching control data to exchanging switch 6 in order to make a connection between line circuit 5 and the warning sound source of tone signal source unit 8 (step 505). The warning sound represents that exchange 1 cannot respond to the paging request indicating that the block MB1 doesn't have any vacant areas. Therefore, the operator of attendant console 40 is notified that the paging operation cannot be carried out. Then, when the operator depresses the restoration key, control unit 9 controls exchanging switch to connect trunk circuit 3a to line circuit 5 again, as in the above described operation.

If control unit 9 finds a vacant storage area address (MB1TOP+i) in block MB1 when the count N is 'i' (steps 502-504), it stores the trunk directory number (TDN) data corresponding to office line 20a, in address X(MB1TOP+i), step 506. Since the data table establishing the relationship between TDN data and office lines 20a-20n is also stored in memory device 7, control unit 9 determines the TDN data corresponding to office line 20a with reference to the table. After storing the TDN data, control unit 9 determines the address Y corresponding to the address X(MB1TOP+i). Since the address Y is to be the address (MB2TOP+i), control unit 9 retrieves the answer code (AC) data from the address (MB2TOP+i) in the memory block MB2, step 507. The retrieved AC data is stored in the memory block MB3 by the control of control unit 9, step 508. Thus, since attendant console 40 does not generate the warning sound when control unit 9 finds the vacant area in the memory block MB1, the operator knows that the paging operation can be carried out.

Therefore, if the operator depresses the paging key, the key data is sent to control unit 9. Control unit 9 sends switching control data to exchanging switch 6 in order to make a speech path between paging trunk circuit 4 and line circuit 5. Control unit 9 also retrieves the stored AC data from the memory block MB3 and sends the data to attendant console 40. Attendant console 40 receives the data and displays the data on its own display. The operator of attendant console 40 announces the incoming telephone call by a statement such as "Mr. A, we received a telephone call from Mr. B. Please dial answer number 1234 at a nearby telephone set." The answer code is known by looking at the displayed AC data on the console. The voice message is sent to loud-speaker 30 through line circuit 5, exchanging switch 6 and paging trunk circuit 4. Loud-speaker 30 amplifies the received voice message and generates it. If the operator of attendant console 40 depresses the restoration key after announcing the incoming telephone call, control unit 9 sends switching control data to exchanging switch 6 in order to break the speech path between paging trunk circuit 4 and line circuit 5 and makes connections between line circuit 5 and the non-sound source of tone signal source unit 8 and between paging trunk circuit 4 and the non-sound source. If control unit 9 does not receive the AC data from one of the EKTs for a predetermined period, it automatically notifies attendant console 40. After attendant console 40 responds to the notification, control unit 9 causes attendant console 40 to display the AC data and causes exchanging switch 6 to make the connection between attendant console 40 and trunk circuit 3a corresponding to the TDN data.

Figure 6:
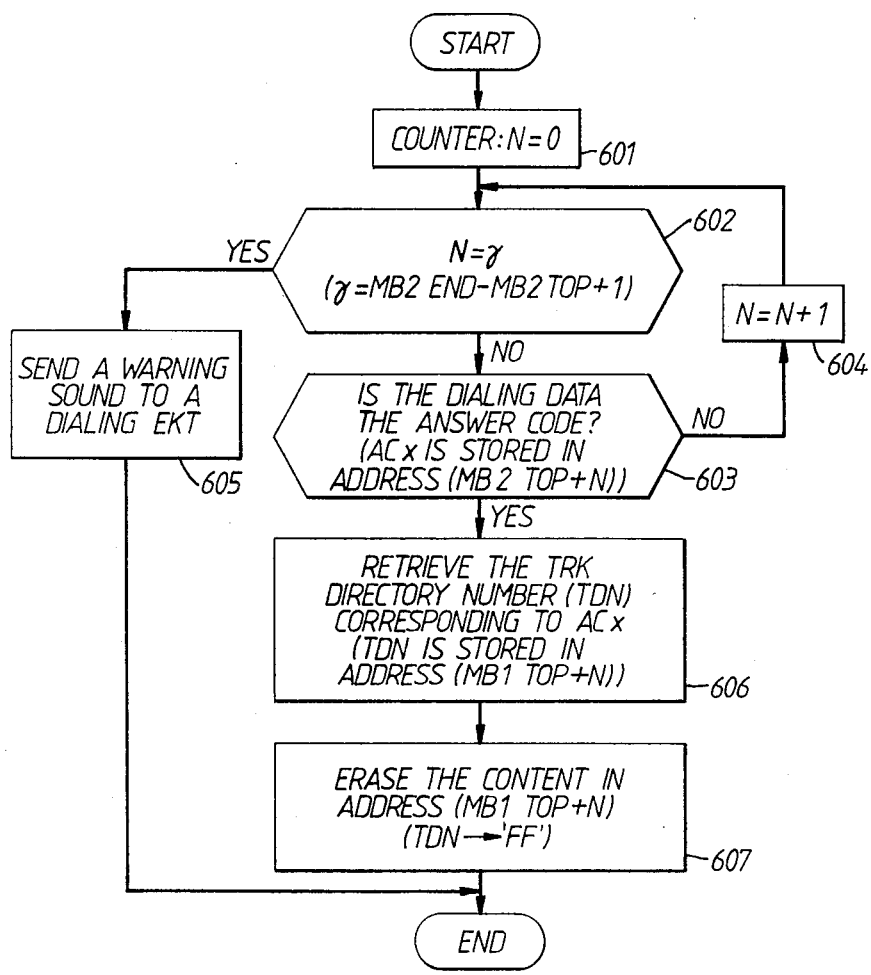
FIG. 6 is a flow chart showing an incoming call detection process when an answer code is dialed in response to a paging operation.

When the called party dials the answer code at one of the EKTs, e.g., EKT 10m, control unit 9 operates as follows. At first, the called party lifts the hand-set of EKT 10m. When the hand-set is lifted, EKT 10m sends OFF-HOOK data to control unit 9 through line circuit 2m and bus 13. Control unit 9 sends switching control data to exchanging switch 6 in response to the OFF-HOOK data. Exchanging switch 6 connects line circuit 2m to the dial tone source of tone signal source unit 8 by the received data. If the called party then dials the answer code, the dialed data is sent to control unit 9. When control unit 9 receives the first dialing number data, it sends switching control data to exchanging switch 6 in order to connect line circuit 2m to the non-sound source of tone signal source unit 8. After receiving all dialing number data, control unit 9 determines whether the dialing data is the extension dial number data, the answer code data or not. If control unit 9 determines the dialing data is the extension dial number data, it controls the extension call. If control unit 9 determines the dialing data is a wrong dial number data, it controls the alarm operation as the described above operation. If control unit 9 determines the dialing data is the useful answer code data, it controls exchanging switch 6 to make a speech path between trunk circuit 3a and line circuit 2m. The determination of the useful answer code data, shown in FIG. 6, is explained as follows.

At first, control unit 9 clears the internal counter indicated by the following: (N=O), step 601. The, control unit 9 determines whether N equals to the address (N=:MB2END-MB2TOP+1), step 602. If not, it further determines whether the received dialing data equals to the stored AC data in address Y (MB2TOP+N), step 603. If not, control unit 9 causes the counter to count up (N=N+1), step 604, and it continues to compare the dialing and AC data (steps 602–604). If control unit 9 determines the received dialing data does not equal to any one of the AC data stored in memory block MB2, it sends switching control data to exchanging switch 6 in order to make a connection between line circuit 2m and the warning sound source of tone signal source unit 8 (step 605). The warning sound represents that the dialing AC data doesn't correspond to any stored AC data. Therefore, the called party of EKT 10m knows that the dialing AC data is a wrong AC data. If control unit 9 determines the received dialing data equals one of the AC data stored in memory block MB2 when the count n is 'i', it determines the address X(MB1TOP+i) and retrieves the TDN data from the address X of the memory block MB1 (step 606). In this operation, if retrieved data is 'FF', control unit 9 causes the warning sound to be sent to EKT 10m as in step 605. After retrieving the TDN data, control unit 9 stores 'FF' in address X (MB1TOP+i) of the memory block MB1 (step 607). Control unit 9 also determines office line 20a corresponding to the retrieved TDN data with reference to the relationship data table between TDN data and office lines. Then, control unit 9 sends switching control data to exchanging switch 6 in order to break the connections between trunk circuit 3a and the waiting sound source and between line circuit 2m and the non-sound source, and make the connection between trunk circuit 3a and line circuit 2m. Thus, since EKT 10m is connected to office line 20a, the called party and the calling originator speak to each other.

In the preferred embodiment, attendant console 40 is connected to loud-speaker 30 in order to notify the called party to receive the incoming telephone call until the operator of attendant console 40 depresses the restoration key. However, attendant console 40 may be connected to loud-speaker 30 as long as the operator keeps on depressing the paging key. Further, in the preferred embodiment, the warning sound is only generated if there are no vacant storage areas available for storage of TDN data, when the operator of attendant console 40 requests to operate the pager. Alternatively, control unit 9 may cause attendant console 40 to display the warning message or turn on an LED. Control unit 9 may also continue to turn on the LED until the memory block MB1 has vacant storage area available. Furthermore, in this embodiment, control unit 9 achieves the paging operation when the incoming telephone call is received from the office line. However, when the incoming telephone call is received from an EKT, control unit 9 may achieve the paging operation, too.

While the invention has been described herein by reference to several preferred embodiments, various modifications can be made without departing from the true scope and spirit of the invention. It is my intention, therefore, by the appended claims, to embody all such modifications.

I claim:

1. In a switching system having an exchange with an exchanging switch coupled to a plurality of telephone lines, a plurality of telephone sets coupled to said exchange, an attendant console coupled to said exchange and speaker means coupled to said exchange, wherein said exchange, responsive to a paging request of an incoming telephone call received from said attendant console, carries out a paging operation by a paging control method, said paging control method comprising the steps of:
   (a) receiving said paging request and storing incoming telephone call data in a memory adapted to store data relating to a plurality of incoming telephone calls;
   (b) determining data relating to at least one of a plurality of answer codes, said determined answer code data corresponding to the stored incoming telephone call data;
   (c) making a speech path between said attendant console and said speaker means;
   (d) comparing the determined answer code data with data dialed from one of said telephone sets; and
   (e) making a speech path between the last mentioned telephone set and one of said plurality of telephone lines corresponding to the stored incoming telephone call data if the dialed data corresponds to the determined answer code data.

2. A switching system having an exchange with an exchanging switch coupled to a plurality of telephone lines, a plurality of telephone sets coupled to said exchange and an attendant console coupled to said exchange, wherein said exchange, responsive to a paging request of an incoming telephone call received from said attendant console, carries out a paging operation, said switching system comprising:

memory means responsive to the paging request for storing incoming telephone call data received by said attendant console, said memory means being adapted to store data from a plurality of incoming telephone calls;

means for determining data relating to at least one of a plurality of answer codes, the determined answer code data corresponding to the stored incoming telephone call data;

speaker means for generating a voice message from an operator of said attendant console in order to announce the incoming telephone call and the determined answer code data to a user; and control means for receiving dialing data from a telephone set and making a speech path between said dialing telephone set and one of said plurality of telephone lines corresponding to the stored incoming telephone call data if the received dialing data corresponds to the determined answer code data.

3. In a switching system having an exchange with an exchanging switch coupled to a plurality of telephone lines, a plurality of telephone sets coupled to said exchange, an attendant console coupled to said exchange and speaker means coupled to said exchange, wherein said exchange, responsive to a paging request of an incoming telephone call received from said attendant console, carries out a paging operation by a paging control method, said paging control method comprising the steps of:

(a) responding to an incoming telephone call received by said attendant console;

(b) determining data relating to at least one of a plurality of predetermined answer codes in response to the paging request, the determined answer code data corresponding to the incoming telephone call;

(c) making a speech path between said attendant console and said speaker means;

(d) displaying the determined answer code data;

(e) receiving dialing data form one of said telephone sets; and (f) making a speech path between the last mentioned telephone set and one of said plurality of telephone lines corresponding to the incoming telephone call if the dialing data corresponds to the displayed answer code data.

4. A switching system having an exchange with an exchanging switch coupled to a plurality of telephone lines, a plurality of telephone sets coupled to said exchange and an attendant console coupled to said exchange, wherein said exchange, responsive to a paging request from said attendant console, carries out a paging operation, said switching system comprising:

means for responding to an incoming telephone call received by said attendant console;

determining data relating to at least one of a plurality of answer codes, the determined answer code data corresponding to an incoming telephone call;

display means for displaying the determined answer code data;

speaker means for generating a voice message from an operator of said attendant console to announce the incoming telephone call and the displayed answer code data; and control means for receiving dialing data from said telephone set and making a speech path between said dialing telephone set and one of said plurality of telephone lines corresponding to the incoming telephone call if the received dialing data corresponds to the displayed answer code data.

5. In a switching system having an exchange with an exchanging switch coupled to a plurality of telephone lines, a plurality of telephone sets coupled to said exchange, an attendant console coupled to said exchange and speaker means coupled to said exchange, wherein said exchange, responsive to a paging request received from said attendant console, carries out a paging operation by a paging control method, said paging control method comprising the steps of:

(a) receiving said paging request and storing incoming telephone call data in a vacant area of a memory adapted to store data relating to a plurality of incoming telephone calls, said incoming telephone call data relating to said attendant console;

(b) determining data relating to one of a plurality of predetermined answer codes, the determined answer code data corresponding to the stored incoming telephone call data;

(c) making a speech path between said attendant console and said speaker means;

(d) displaying the determined answer code data;

(e) comparing the determined answer code data with dialing data from one of said telephone sets; and (f) making a speech path between the last mentioned telephone set and one of said plurality of telephone lines corresponding to the stored incoming telephone call data if the dialing data corresponds to the determined answer code data.

6. The method of claim 5 further comprising the step of:

sending a waiting signal to said telephone line corresponding to the stored incoming telephone call data until the speech path between said dialing telephone set and said one of said plurality of telephone lines is made.

7. The method of claim 5 further comprising the step of:

erasing the stored incoming telephone call data when the speech path between said dialing telephone set and said one of said plurality of telephone lines is made.

8. The method of claim 5 further comprising the step of:

storing the determined answer code data.

9. In a switching system having an exchange with an exchanging switch coupled to a plurality of telephone lines, a plurality of telephone sets coupled to said exchange, an attendant console coupled to said exchange and speaker means coupled to said exchange, wherein said exchange, responsive to a paging request received from said attendant console, carries out a paging operation by a page control method, said paging control method comprising the steps of:

(a) receiving said paging request and determining whether a memory has vacant areas available for storing incoming telephone call data, said memory being adapted to store data relating to a plurality of incoming telephone calls;

(b) sending a warning sound to said attendant console in order to notify an operator when no vacant area is available for storage;

(c) storing said incoming telephone call data in a vacant area if at least one vacant area is available for storage;
(d) determining data relating to one of a plurality of predetermined answer codes, the determined answer code data corresponding to the stored incoming telephone call data;
(e) making a speech path between said attendant console and said speaker means;
(f) displaying the determined answer code data;
(g) comparing the determined answer code data with dialing data from one of said telephone sets; and
(h) making a speech path between the last mentioned telephone set and one of said telephone lines corresponding to the stored incoming telephone call data if the dialing data corresponds to the determined answer code data.

10. The method of claim 9 further comprising the step of:
sending a waiting signal to said telephone line corresponding to the stored incoming telephone call data until the speech path between said dialing telephone set and said one of said plurality of telephone lines is made.

11. The method of claim 9 further comprising the step of:
erasing the stored incoming telephone call data when the speech path between said dialing telephone set and said one of said plurality of telephone lines is made.

12. The method of claim 9 further comprising the step of:
storing the determined answer code data.

13. In a switching system having an exchange with an exchanging switch coupled to a plurality of telephone lines, a plurality of telephone sets coupled to said exchange, an attendant console coupled to said exchange and speaker means coupled to said exchange, wherein said exchange, responsive to a paging request received from said attendant console, achieves a paging operation by paging control method, said paging control method comprising the steps of:
(a) receiving said paging request and storing data relating to an incoming telephone call in a vacant area of a memory adapted to store data relating to a plurality of to incoming telephone calls;
(b) determining data relating to one of a plurality of predetermined answer codes, the determined answer code data corresponding to the stored incoming telephone call data;
(c) making a speech path between said attendant console and said speaker means;
(d) displaying the determined answer code data;
(e) comparing the determined answer code data with dialing data from one of said telephone sets;
(f) sending a warning signal to said dialing telephone set to notify a user that the dialing data does not correspond to any determined answer code data; and
(g) making a speech path between the last mentioned telephone set and one of said plurality of telephone lines corresponding to the stored incoming telephone call data if the dialing data corresponds to the determined answer code data.

14. The method of claim 13 further comprising the step of:
sending a waiting signal to said telephone line corresponding to the stored incoming telephone call data until the speech path between said dialing telephone set and said one of said plurality of telephone lines is made.

15. The method of claim 13 further comprising the step of:
erasing the stored incoming telephone call data when the speech path between said dialing telephone set and said one of said plurality of telephone lines is made.

16. The method of claim 13 further comprising the step of:
storing the determined answer code data.

17. A switching system having an exchange with an exchanging switch coupled to a plurality of telephone lines, a plurality of telephone sets coupled to said exchange and an attendant console coupled to said exchange, wherein said exchange, responsive to a paging request received from said attendant console, achieves a paging operation, said switching system comprising:
first memory means responsive to the paging request for storing incoming telephone call data that relates to said attendant console, said first memory means being adapted to store data relating to a plurality of incoming telephone calls;
second memory means for storing data relating to a plurality of answer codes, the stored incoming telephone call data corresponding to one of the answer codes;
display means for displaying the answer code data corresponding to the stored incoming telephone call data;
speaker means for announcing the incoming telephone call and the displayed answer code data to a user; and
control means for receiving dialing data from one of said telephone sets and making a speech path between said dialing telephone set and one of said plurality of telephone lines corresponding to the stored incoming telephone call data if the received dialing data corresponds to the answer code data.

18. The system of claim 17 wherein said first and second memory means have substantially the same number of available storage areas.

19. The system of claim 17 further comprising a third memory means for storing the determined answer code data to be displayed on said display means.

20. The system of claim 17 further comprising means for sending a waiting signal to said telephone line corresponding to the stored incoming telephone call data until the speech path between said dialing telephone set and said telephone line is made.

21. the system of claim 17 further comprising means for erasing a stored incoming telephone call data when the speech path between said of said plurality of dialing telephone set and said telephone lines is made.

22. A switching system having an exchange with an exchanging switch coupled to a plurality of telephone lines, a plurality of telephone sets coupled to said exchange and an attendant console coupled to said exchange, wherein said exchange, responsive to a paging request received from said attendant console, achieves a paging operation, said switching system comprising:
first memory means for storing incoming telephone call data received by said attendant console, said first memory means being adapted to store data relating to a plurality of incoming telephone calls;

means responsive to the paging request for determining if a vacant storage area exists within said first memory means;

means for storing the incoming telephone call data in said vacant storage area within said first memory means if a vacant storage area exists;

means for sending a warning signal to said attendant console in order to notify an operator when no vacant storage area exists;

second memory means for storing data relating to a plurality of answer codes, the stored incoming telephone call data corresponding to one of the answer codes;

display means for displaying the answer code data corresponding to the stored incoming telephone call data;

speaker means for announcing the incoming telephone call and the displayed answer code data to a user; and control means for receiving dialing data from the last mentioned telephone set and making a speech path between said dialing telephone set and one of said plurality of telephone lines corresponding to the stored incoming telephone call data if the received dialing data corresponds to the answer code data.

23. The system of claim 22 wherein said first and second memory means have substantially the same number of available storage areas.

24. The system of claim 22 further comprising a third memory means for storing the determined answer code data to be displayed on said display means.

25. The system of claim 22 further comprising means for sending a waiting signal to said telephone line corresponding to the stored incoming telephone call data until the speech path between said dialing telephone set and said telephone line is made.

26. The system of claim 22 further comprising means for erasing the stored incoming telephone call data when the speech path between said of said plurality of dialing telephone set and said telephone lines is made.

27. A switching system having an exchange with an exchanging switch coupled to a plurality of telephone lines, a plurality of telephone sets coupled to said exchange and an attendant console coupled to said exchange, wherein said exchange, responsive to a paging request received from said attendant console, achieves a paging operation, said switching system comprising:

first memory means responsive to the paging request for storing incoming telephone call data received by said attendant console, said first memory means being adapted to store data relating to a plurality of incoming telephone calls;

second memory means for storing data relating to a plurality of answer codes, the stored incoming telephone call data corresponding to one of the answer codes;

display means for displaying the answer code data corresponding to the stored incoming telephone call data;

speaker means for announcing the incoming telephone call and the displayed answer code data to a user;

means for comparing the answer code data corresponding to the stored incoming telephone call data with the dialing data from the last mentioned telephone set;

means for sending a warning signal to said dialing telephone set to notify the user when no answer code data corresponds to the dialing data;

means for making a speech path between said dialing telephone set and one of said plurality of telephone lines corresponding to the stored incoming telephone call data if the dialing data corresponds to the answer code data.

28. The system of claim 27 wherein said first and second memory means have substantially the same number of available storage areas.

29. The system of claim 27 further comprising a third memory means for storing the determined answer code data to be displayed on said display means.

30. The system of claim 27 further comprising means for sending a waiting signal to said telephone line corresponding to the stored incoming telephone call data until the speech path between said dialing telephone set and said telephone line is made.

31. The system of claim 27 further comprising means for erasing the stored incoming telephone call data when the speech path between said of said plurality of dialing telephone set and said telephone lines is made.

* * * * *